United States Patent [19]

Zehner

[11] Patent Number: 5,506,812
[45] Date of Patent: Apr. 9, 1996

[54] TOROIDAL VOLUME SEARCH SONAR

[75] Inventor: William J. Zehner, Lynn Haven, Fla.

[73] Assignee: The United States of America as represented by the Secretary of the Navy, Washington, D.C.

[21] Appl. No.: 83,606

[22] Filed: Jun. 30, 1993

[51] Int. Cl.⁶ ............................................. G01S 15/89
[52] U.S. Cl. ............................................. 367/88
[58] Field of Search ............................. 367/88, 106

[56] References Cited

U.S. PATENT DOCUMENTS 4,300,215  11/1981  Jones ................................. 367/88

*Primary Examiner*—Daniel T. Pihulic
*Attorney, Agent, or Firm*—Edward J. Connors, Jr.; William C. Townsend

[57] ABSTRACT

A pulsed-transmission, narrow-band, echo-ranging sonar system has a tow body in which the transmit and receive arrays are mounted so that the field searched forms a toroidal volume.

4 Claims, 5 Drawing Sheets

END VIEW

END VIEW

SIDE VIEW

10C

TOROIDAL VOLUME SEARCH SONAR

SPECIFICATION

BACKGROUND OF THE INVENTION

This invention relates to pulsed-transmission, narrow-band, echo-ranging sonar systems, and more particularly to an improved method of searching for objects in the volume of a body of water.

The principal object of this invention is to provide an improved method of acoustic detection of objects located in the water column.

A second object is to obtain a more complete coverage of the entire water column (i.e., detect objects closer to interfaces such as sea surface and bottom).

A further object of this invention is to increase the detection probability and reduce the false alarm probability over conventional designs.

A further object is to make more effective use of the limited space for sensor arrays on a small torpedo-shaped sonar towfish.

A further object is to make the performance of the sonar independent of sea state and type of sea bottom.

A further object is to search the widest possible path in a single pass with a given vehicle diameter.

A further object of the invention is to be insensitive to non-uniform motion of the sonar vehicle.

A further object is to make the performance of the sonar substantially independent of the proximity of the sonar to the sea bottom or surface.

DETAILED DESCRIPTION OF THE PREFERRED EMBODIMENTS

Figure 1A:
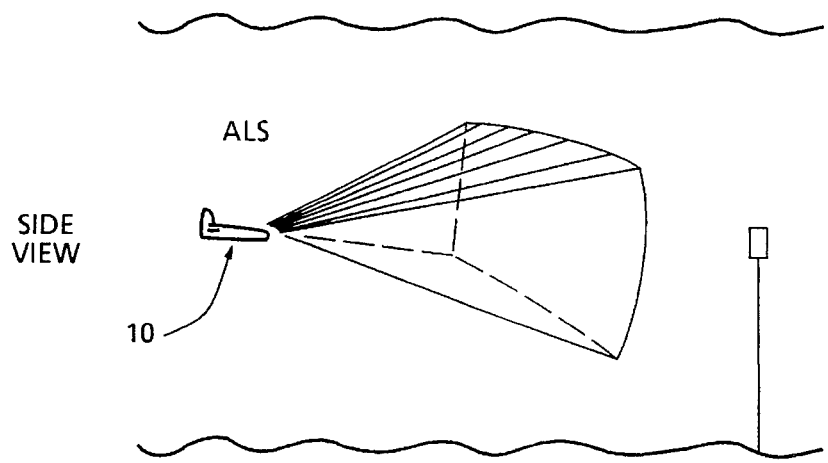
FIGS. 1A and 1B show conventional ahead-looking sonar (ALS).
Figure 1B:
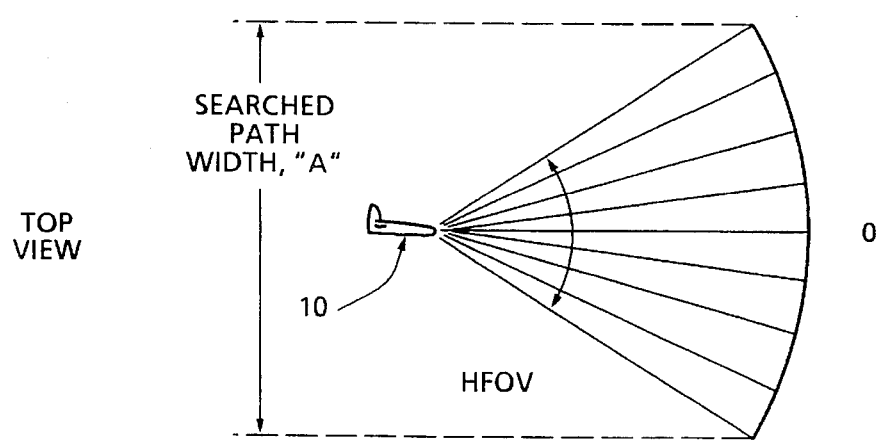

The conventional approach to searching for objects in the water column (not touching or close to the surface or bottom interfaces) is an ahead-looking sonar (ALS) 10, depicted in FIG. 1. A plurality of contiguous receiving beams is formed simultaneously in a horizontal fan ahead of the sonar tow body. Short pulses of narrow band width are emitted and objects in the water column return echoes to the receiver where their location in slant range and bearing is determined from the two-way travel time and the receiving beam orientation. It is not difficult to design ALSs with good performance against free-field targets, as has been frequently demonstrated. However, when the ALS is operated near an interface, the beams receive high levels of reverberation that tend to obscure targets located on or near the interfaces. Under such conditions, typical signal-to-reverberation ratios are too low to provide adequate detection probabilities with reasonably low false alarm rates. The available remedies are: (1) use shorter pulse lengths, (2) use smaller beam widths or (3) operate the sonar very close to the interface to reduce the grazing angle, and hence, the reverberation. However, (1) pulse lengths shorter than the target of interest are not beneficial since they reduce the target echo as well as reverberation; (2) smaller beam widths require larger apertures for the array, and these cause excessive hydrodynamic drag and handling problems; and (3) when operating near one interface (say, the bottom), reverberation from the other interface increases, rendering the sonar useless in that area and requiring multiple passes at various depths to search the entire water column.

Further, sonars are usually designed to operate against medium (sandy) bottoms and moderate sea states (2 or less). When slightly harder bottoms or higher sea states occur, reverberation increases considerably (10 dB or more) and it will be evident to those skilled in the art that a 3 dB decrease in signal-to-reverberation ratio can cause a very large (six orders of magnitude) increase in false alarm rate for a given probability of detection, thus rendering the sonar useless.

Figure 2A:
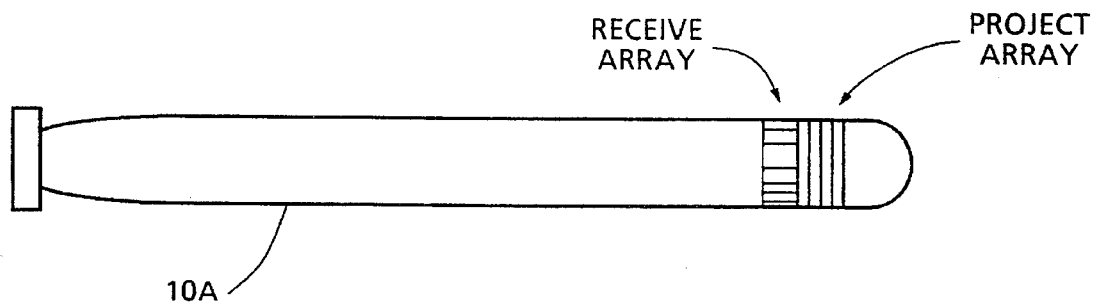
FIGS. 2A, 2B, 2C and 2D show toroidal volume search sonars (TVSSs).
Figure 2D:
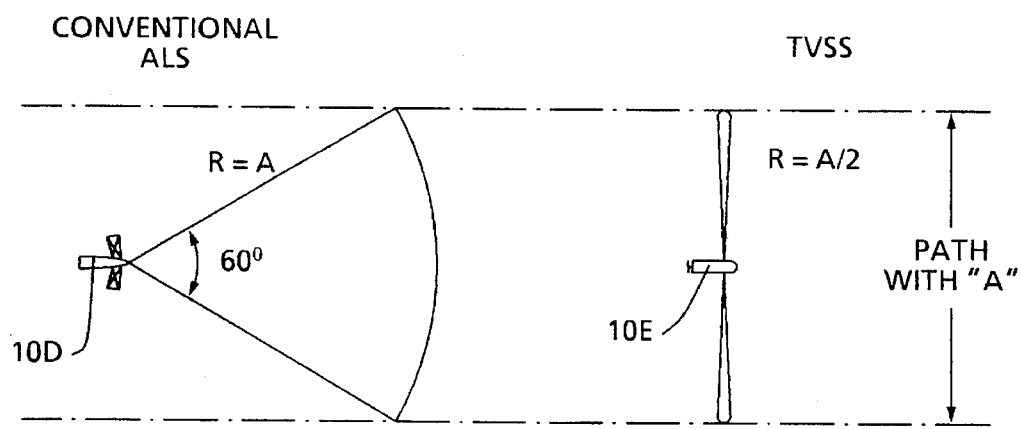
Figure 2B:
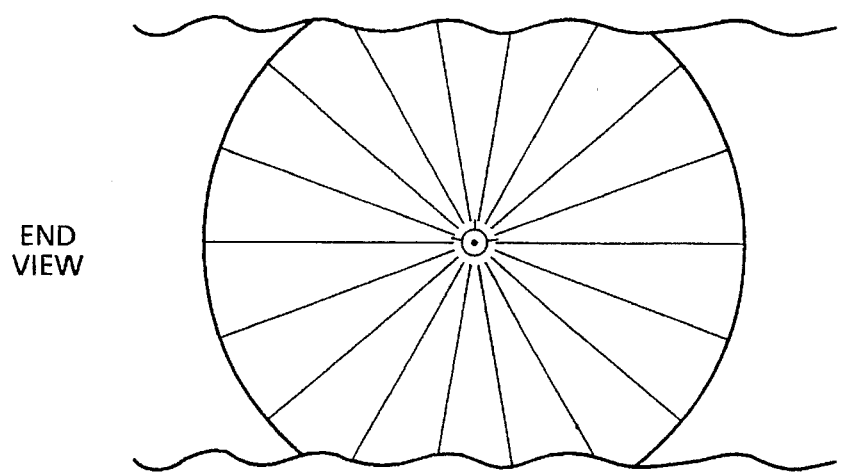

An alternate arrangement of array geometry that is optimal for a torpedo-shaped tow body 10A uses a cylindrical array mounted radially around the body circumference as shown in FIG. 2A. The projector radiates a toroidal pattern in a plane normal to the tow body axis, and a similar cylindrical array is used to form a number of narrow, simultaneous, contiguous, conical receive beams covering 360 degrees around the tow body 10C as shown in FIG. 2B. The forward motion of the tow body allows the sonar to search a cylindrical volume of radius R.

Figure 2C:
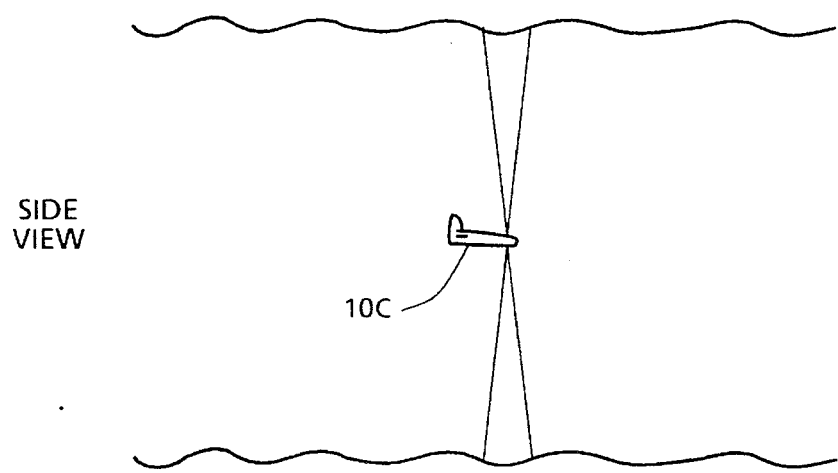

There are a number of advantages to this design. For any given horizontal field of view (HFOV) less than 180 degrees, the required ALS transmission range is larger than that of the toroidal volume search sonar (TVSS) for any given swept path width requirement ("A" value). As an example, a typical ALS 10D with a 60 degree HFOV, as illustrated in FIG. 2C, must transmit and receive twice as far (slant range) as the TVSS 10D for any given "A" requirement. This alone is an enormous design advantage, reducing spreading loss by 12 dB and eliminating one-half of the absorption loss.

Figure 3A:
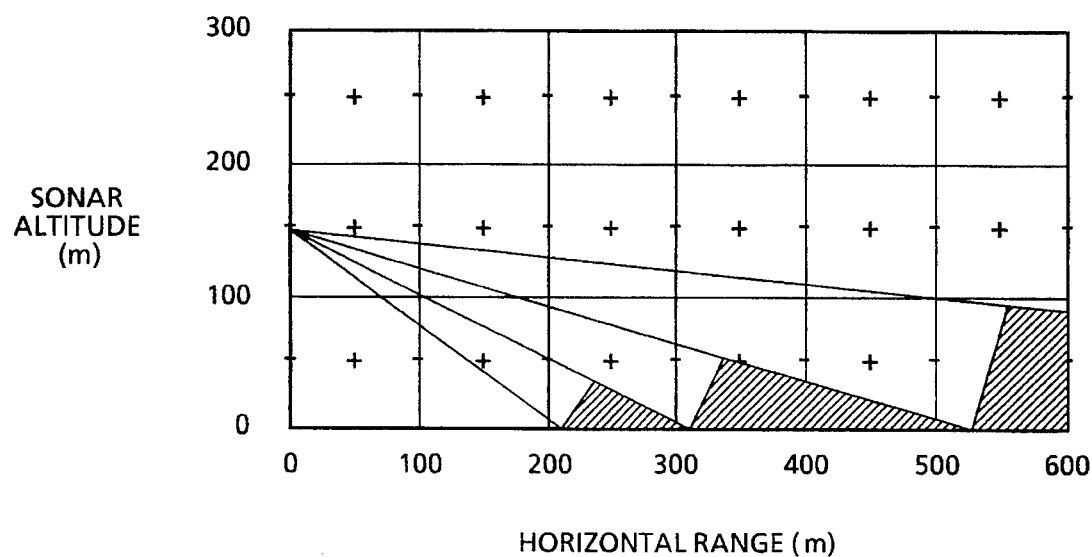
FIGS. 3A and 3B compare conventional and toroidal patterns.
Figure 3B:
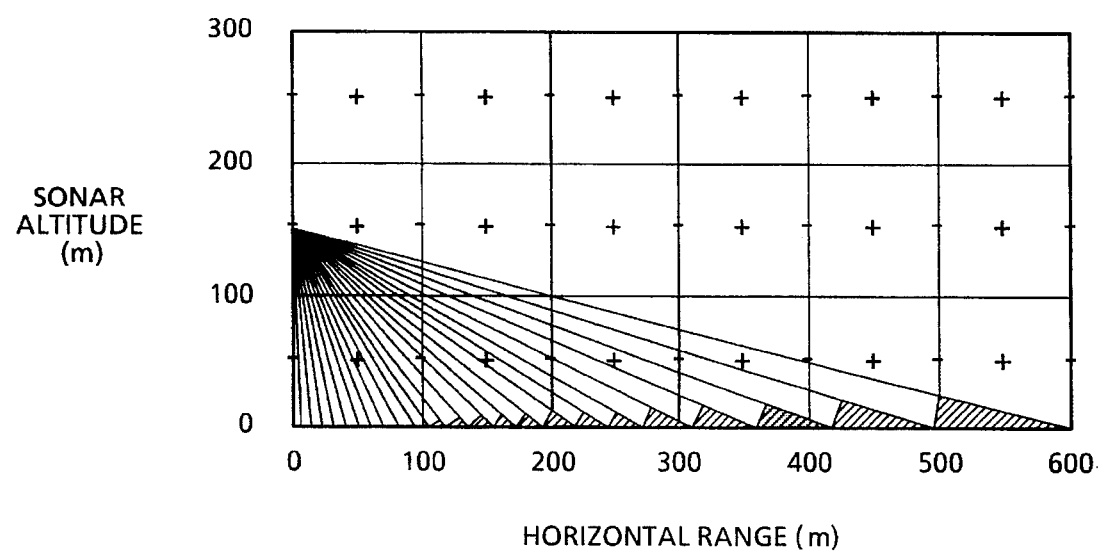
Figure 4:
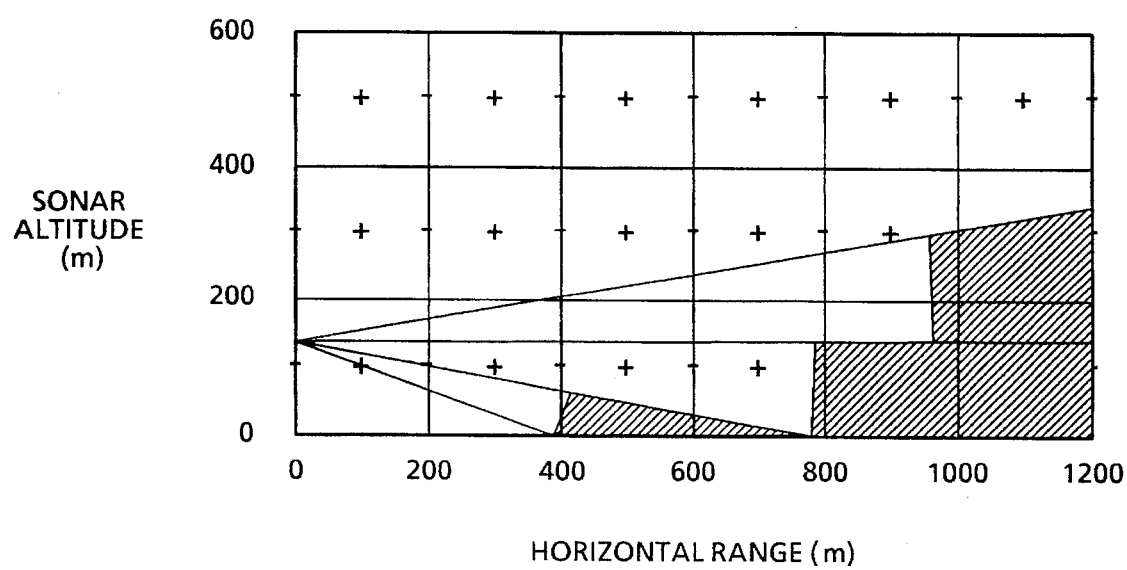
FIG. 4 shows a vertical beam pattern.

An even greater advantage is shown in FIGS. 3A and 3B. Several typical ALS vertical-plane beams at various depression angles in front of the sonar are shown in FIG. 3A. Normally, only one of these can be used on any given transmission. Alternate beams are selected on successive transmissions to cover the volume. The cross-hatched area indicates zones in which targets, whether on the bottom, or near it, will be obscured by reverberation. In the hypothetical geometry shown, targets as far as 100 meters above the bottom are occluded by reverberation. By contrast, it will be evident to those skilled in the art that the cylindrical array geometry permits the formation of much narrower beams radially from the side of the towfish for any given towfish diameter. This is shown in FIG. 3B in a vertical plane perpendicular to the vehicle. In this case, targets can be easily detected down to within 30 meters of the bottom, a factor of about 3 better than the ALS. (Note: For clarity, only a few beams in the lower half space are shown in FIG. 3B). In practice, beams are formed all the way around the TVSS body, unlike the ALS which can only irradiate a single depression angle with any given transmission. It will be evident to those skilled in the art that the actual improvement is even greater than shown in FIGS. 3A and 3B, because, as previously noted, the ALS must transmit to greater ranges than the TVSS for a given "A" value. Thus, as shown in FIG. 4, targets as far as 200 meters from the interface are occluded by reverberation for the hypothetical geometry shown.

It will be evident to those skilled in the art that the performance of the TVSS will be independent of bottom type and sea state since no detection is attempted in regions of interface reverberation. It will also be evident that this design, because of its large signal-to-reverberation ratios, permits a more effective use of automatic (computer-assisted) detection processors.

Many conventional ALS designs must use some form of multiple-ping incoherent target integration for detection because of the low signal-to-interference ratios inherent in that generic approach. That technique requires either highly uniform motion of the sonar vehicle, or highly accurate measurement of the non-uniform motion to accomplish the multiple-ping integration successfully. Because of the high signal-to-interference ratio inherent in the new TVSS design, multiple looks (transmissions) are not required for detection. Hence, the sensor is much less sensitive to motion errors (by an order of magnitude) than the conventional approach and does not require motion sensors and computationally intensive motion correction.

It will be evident that the actual beamforming hardware itself can be of conventional design for cylindrical arrays (normally used in a horizontal plane) and that the usual computational advantages associated with the circular symmetry apply here as well.

I claim:

1. A pulsed-transmission, narrow band, echo-ranging sonar system comprising a body designed to be towed in a predetermined direction which is generally parallel to the surface of the earth, and an array of transmitter elements mounted on the body in a first generally cylindrical pattern, a plane passing through the first cylindrical pattern being perpendicular to the predetermined direction, whereby the area viewed by the transmitter elements forms a toroid when the body is towed.

2. A pulsed-transmission, narrow band, echo-ranging sonar system comprising a body designed to be towed in a predetermined direction generally parallel to the surface of the earth, and an array of receiver elements mounted on the body in a second generally cylindrical pattern, a plane passing through the second cylindrical pattern being perpendicular to the predetermined direction, whereby the area viewed by the receiver elements forms a toroid when the body is towed.

3. A pulsed-transmission sonar system according to claim 1 and further including an array of receiver elements mounted on a second body in a second generally cylindrical pattern, a plane passing through the second cylindrical pattern being perpendicular to the predetermined direction, whereby the area viewed by the receiver elements forms a toroid when the body is towed.

4. A pulsed-transmission sonar system according to claim 3 in which the first and second bodies are the same.

* * * * *